United States Patent

[11] 3,576,947

[72] Inventor Lawrence W. Kruger
Newbury Park, Calif.

[21] Appl. No. 791,685
[22] Filed Jan. 16, 1969
[45] Patented May 4, 1971
[73] Assignee The United States of America as represented by the Secretary of the Navy

[54] RAPID FRAME SYNCHRONISM OF SERIAL BINARY DATA
7 Claims, 1 Drawing Fig.

[52] U.S. Cl. 178/69.5, 179/15, 340/146.1
[51] Int. Cl. H04n 1/32
[50] Field of Search 178/69.5, 58; 179/15 (SYNC); 340/146.1; 325/42, 38

[56] References Cited

UNITED STATES PATENTS

| | | | |
|---|---|---|---|
| 3,144,515 | 8/1964 | Kaneko | 179/15(Sync) |
| 3,200,198 | 8/1965 | McRae | 179/15(Sync) |
| 3,312,938 | 4/1967 | Cousins et al. | 340/146.1 |
| 3,463,887 | 8/1970 | Ito | 178/69.5 |
| 3,466,601 | 9/1969 | Tong | 178/69.5 |

*Primary Examiner*—Robert L. Griffin
*Assistant Examiner*—Richard P. Lange
*Attorneys*—Edgar J. Brower and H. H. Losche

ABSTRACT: A circuit means of detecting the synchronizing word in not more than two frames of serial binary information data having the serial data clocked through a shift register sync window and alternate gates for the sync word and its complement to a pair of frame bit shift registers to store the serial data for comparing consecutive frames for the sync word and its complement to produce an output signal after two consecutive frames of input data, any miss of sync word detection in two frames causing circuit switching to reset the circuit means for subsequent detection of the sync word.

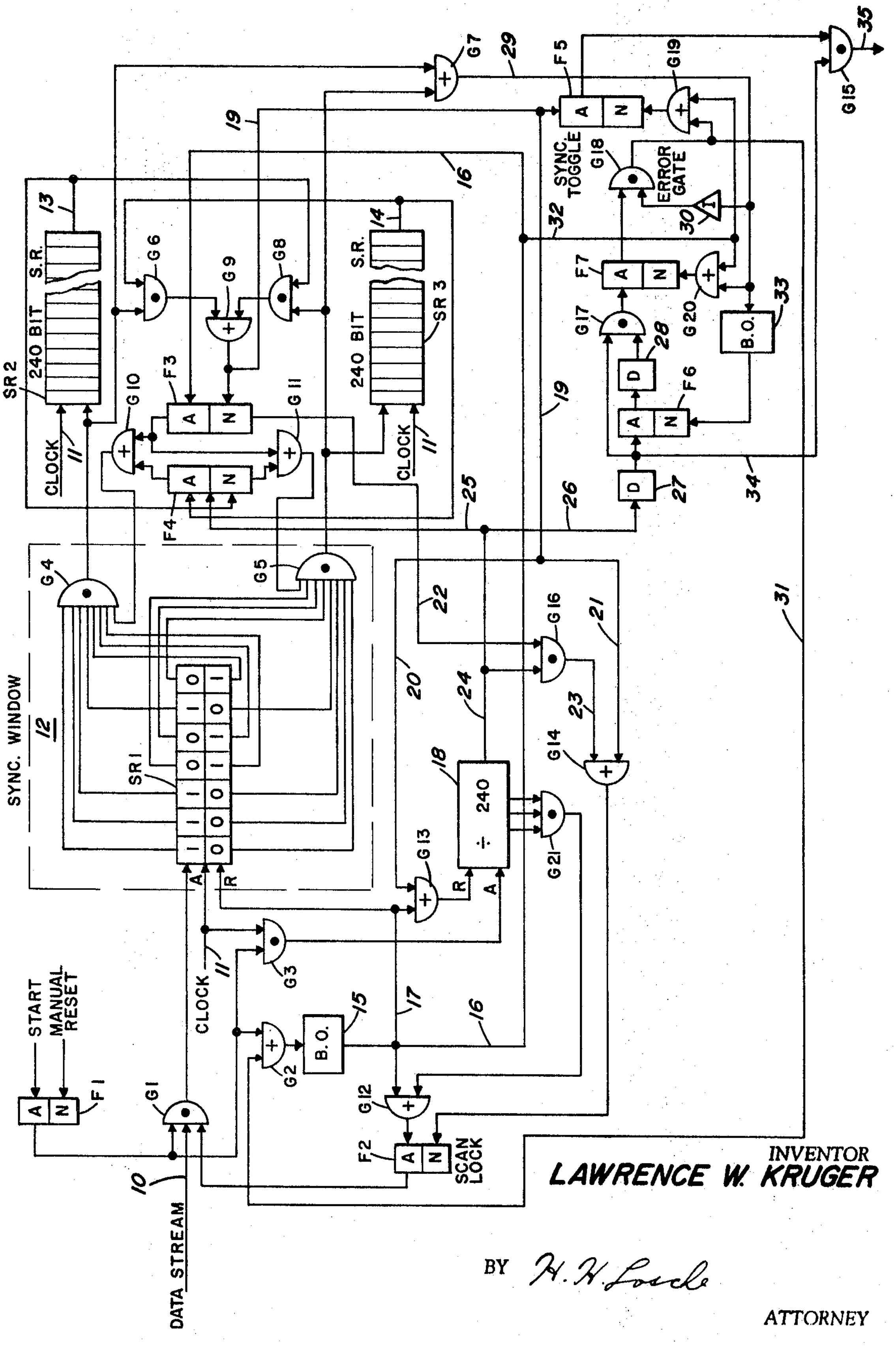
INVENTOR
LAWRENCE W. KRUGER
BY H. H. Losche
ATTORNEY

RAPID FRAME SYNCHRONISM OF SERIAL BINARY DATA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sync detectors for serial binary telemetering of binary information of range, azimuth, elevation, etc., to a receiver where it is necessary to detect sync signals to synchronize the frames of information.

In prior known devices the information is sent out in serial digital form in blocks or groups called "frames." It is necessary to be able to identify some discrete position in each frame, such as the beginning or end, before it is possible to operate on or use the data at the receive end. This identification is a sync word in the frame providing a pattern of 1's and 0's in what is known as a Barker word of seven digits. This may be, for example, arranged as 1 1 1 0 0 1 0 and the complement would be 0 0 0 1 1 0 1. One of the problems that is encountered in this situation is that false sync words may occur which are actually bits of information occurring as sync words by coincidence. The sync detectors of prior known devices can reject only one false sync word in every frame leaving other sync words to be detected improperly. The time to acquire or reacquire sync may require many frames greatly reducing the effectiveness of readout of the needed information which may be for target acquisition. It is important that frame synchronization be achieved in the shortest possible time. Increasing the digital length of the sync word helps appreciably, however, the percentage of information wasted on the sync word increases and is undesirable.

SUMMARY OF THE INVENTION

In the present invention two shift registers, each the bit length of the data frame bits, have the data stream fed through a sync window shift register to direct the real sync word to one of the data length registers and the sync word complement to the other data length registers. The real sync word (or the sync word complement) detected in the first digital frame is compared with the complement sync word (or real sync word) in the second digital frame received. If the occurrence is duplicated in time and place in each of the two frames, the sync signal is "true" which will cause an output signal to register sync detection. A counter for the full length of the digital data transmission including the sync word is operative to set gating circuits to establish the digital data information in a fixed relation to the sync word of each frame. By this means only two frames are necessary to establish the sync word, and data information which happen to construct the sync word will be eliminated. It is therefore a general object of this invention to provide a sync word detector for a receiver in a telemetering system that will detect a true sync word within two digital data information frames coming from a data stream.

BRIEF DESCRIPTION OF THE DRAWING

These and other objects and the attendant advantages, features, and uses will become more apparent to those skilled in the art as the description proceeds when taken along with the accompanying single FIGURE of drawing illustrating the invention in a block circuit schematic diagram.

DESCRIPTION OF THE PREFERRED EMBODIMENT

Referring more particularly to the FIGURE of drawing there is shown an input conductor 10 over which is applied a stream of digital data as one input to an AND gate G1. A start signal for the circuit is applied by a push button or other feasible means to switch a toggle circuit, such as a bistable multivibrator F1, to produce on its output a second input to the AND circuit G1. The toggle circuit F1, constructed as a bistable multivibrator circuit, is shown as having an advance or "on" position A and a reset or "off" position designated by the letter N. The F1 output A is also applied as one input to an OR gate G2 and an AND gate G3. A third input to the AND gate G1 is from the A output of a scan lock toggle circuit or multivibrator F2. The output of the AND circuit G1 is coupled as an input to a shift register SR1 to which shift register is also applied clock pulses from a clock source over the conductor means 11 to advance the shift register SR1 for each clock pulse in accordance with the data stream applied from conductor 10 through AND gate G1. The shift register SR1 has each bit coupled to a pair of AND gates G4 and G5, the shift register and AND gates constituting a sync window 12. The sync window 12 has the bits connected to gates G4 and G5 in a manner to recognize or detect a sync word in the data stream herein shown to be 1 1 1 0 0 1 0 with its complement 0 0 0 1 1 0 1. As may be seen in the sync window 12 the positive bits, or 1's, are coupled as inputs to AND gate G4 while the 0 bits are coupled as inputs to AND gate G5. The output of AND gate G4 is coupled as a data input to a 240-bit shift register, identified as SR2, while the output of the AND gate G5 is coupled as the data input to a 240-bit shift register, designated as SR3. Each bit shift register SR2 and SR3 has a clock pulse source applied thereto over conductor means 11 to shift the data down the bit register, as is well understood by those skilled in the art. These registers account for 233 bits of data plus the 7-bit sync word. The output of the gate G4 is also coupled as an input to a detecting AND gate G6 as well as to a detecting OR gate G7, while the output of the AND gate G5 is also coupled as an input to a detecting AND gate G8 as well as to the detecting OR gate G7. The output from each AND gate G6 and G8 is coupled to an OR gate G9 and the output of OR gate G9 is coupled to the not-advance or N terminal of a bistable multivibrator F3. The advance terminal of F3 is coupled in common as an input to OR gates G10 and G11. The output of OR gate G10 is coupled as one input to AND gate G4, while the output of OR gate G11 is coupled as an input to AND gate G5. Another bistable multivibrator F4 has its A output coupled as an input to the OR gate G10 and its N output coupled as an input to OR gate G11. The output 13 of the shift register SR2 is coupled as an input to the N terminal of F4 and also as a second input to the AND gate G8. The output 14 of the shift register SR3 is coupled as the A input to F4 and also as a second output to the AND gate G6. The circuit thus far described is of the sync window 12 and the part of the circuit for detecting a true sync word in the sync frames applied in the data stream over the conductor 10.

The output of the OR gate G2 is coupled to a blocking oscillator 15, or equivalent triggering device, the output of which is coupled into three branch circuits, one branch circuit of which is applied to an OR gate G12, the second branch circuit 16 to the A terminal of the multivibrator F3, and the branch circuit 17 to the reset terminal of SR1 and to the input of an OR gate G13. The output of the OR gate G12 is applied to the A terminal of F2. The output of the OR gate G13 is applied to the reset terminal of a 240-bit counter circuit 18. The output of the OR gate G9 is conducted by way of conductors 19 and 20 as a second input to the OR gate G13 and by conductors 19 and 21 to a frame time OR gate G14, the output of OR gate G14 being to the N terminal of the scan lock multivibrator F2. The G9 OR gate output 19 is also coupled to the A terminal of an output bistable multivibrator F5. The output of the A terminal of F5 is coupled as in input to an output AND gate G15. The N output of F3 is coupled by way of conductor 22 as the second input to a frame time AND gate G16, the output 23 of which is the second input to the AND GATE G14. The second input to frame time AND gate G16 is the output from the 240-bit counter 18 by way of the conductor means 24 and a branch conductor 25 to the bistable multivibrator F4 to flip this multivibrator to a condition opposite of that in which it is at the time the pulse is applied over conductor 25, as well understood in the operation of such bistable multivibrators by those skilled in the art. The output of the OR gate G14 is to the N terminal of the scan lock multivibrator F2. Another branch conductor 26 from the output 24 of the counter 18 is applied to a delay circuit 27, the output of which is to a bistable multivibrator F6 at the A terminal input. The output terminal A of F6 is applied to a second delay circuit 28, the output of which is to an AND gate G17. The output of G17 is to the A terminal of a bistable multivibrator F7, the A output terminal of which is to an AND gate G18, the second input to this AND gate G18 being the output 29 from OR gate G7 through an inverter 30. The output of AND gate G18 is by way of a conductor means 31 as one input to an OR gate G19 and also as one input to the OR gate G2. The second input to OR gate G19 is from conductor 16 out of the blocking oscillator 15 by way of the conductor means 32. Conductor 32 is also coupled as one input to an OR gate G20, the output of which is to the N terminal of the bistable multivibrator F7. The output 29 from OR gate G7 is also coupled as a second input to the OR gate G20 and also to a blocking oscillator 33, the output of which is to the N terminal of the bistable multivibrator F6. The output of the delay circuit 27 is by way of conductor means 34 as the second input to the output AND gate G15 to produce an output signal on the output conductor 35 whenever the signals from A terminal of F5 and from the delay circuit 27 on the output 34 are coincident.

OPERATION

Let it be assumed that frames of a data stream of digital signals for the transmission or telemetering of such information as range, elevation, altitude, et cetera, are transmitted in digital form. Within this data stream is a sync word for synchronizing the receiver with the transmission of digital information. Accordingly, it is important to detect this sync word for the reconstruction of the frames of digital information in the receiver. When the start signal is applied manually or otherwise in F1, this signal is applied through OR gate G2 to the blocking oscillator 15 which produces a pulse to set and reset the various elements. The output of blocking oscillator 15 is coupled through the OR gate G12 to set F2 in its A output condition, to set F3 in its A output condition, to reset F5 to its N condition through OR gate 19, and to rest F7 in its N condition through the OR gate G20. The output of blocking oscillator 15 over conductor 17 through OR gate G13 resets the counter 18 to begin its initial count and also resets the shift register SR1 to its starting position. F2 being in its A condition opens AND gate G1 to conduct the data stream to the shift register SR1 in the sync window 12 which will clock through the digital data by the clock pulses over conductor means 11.

When the sync window shift register SR1 arrives at the sync word, for example as shown in this FIGURE, with all 1's appearing applied to gate G4, gate G4 will produce an output to the shift register SR2 and this will be pulsed through SR2 by clock pulses over conductor means 11. Since F3 is in its A state, the output of the OR gate G10 to gate G4 enables gate G4 to pass an output pulse when all 1's occur in SR1. The output of G4 is applied to AND gates G6 but this gate is closed since there is no output from SR3. The output of AND gate G4 is also applied through OR gate G7 in the output conductor 29 through the inverter 30 to AND gate G18 which will produce an output since both inputs to this AND gate G18 are in the same sense. This output is through the OR gate G19 to place F5 in the N state if it is not already in this state. The output on 29 will also operate through OR gate G20 to place F7 in the N state if it is not already there. Also, this output on 29 will operate through the blocking oscillator to place F6 in its N state if it is not already there. Clock pulses will be gated through the AND gate G3 to be counted in the counter 18 which counter will go through the frame count of 240 bits at which time it will produce on its output 24 a pulse through the delay circuit 27 to switch F6 to its A condition. The delay circuits 27 and 28 delay the pulse for the duration of each 240 count. In the next frame of data stream the complement of the sync word should appear in the same place as the sync word would in the preceding frame and when this complement is detected by all 1's being applied to the gate G5 (the upper register showing the complement 0 0 0 1 1 0 1), gate G5 will pass an output pulse to the AND gate G8 which should coincide in time with an output from the shift register SR2 since the first sync word has been progressing through the 240 (240–$a$7 sync word = 233) -bit shift register SR2 at the same time the complementary word has been clocked through its sequence. For example, since the sync word was present on gate G4, the complement of this sync word should appear at the same place in the frame of digital data as the sync word although other digital data may correspond to the sync word or the complement of the sync word at different places in the frame. By virtue of the complement of the sync word being positioned in the data stream frame the same as the sync word, all false sync word data will be eliminated. This is accomplished by the complement of the sync word producing a pulse on the G5 AND gate output to the input of gate G8 at the same time the sync word output signal over 13 comes from SR2. This sync word detected signal is therefore passed through AND gate G8 and through OR gate G9 to trip F3 in its N condition and also to trip F5 to its A condition placing one input on output AND gate G15. Counter 18 will have completed its count through the first frame to produce a pulse through the delay circuit 27 for a delay of one 240 count to produce a pulse on the output 34 which is the second input to the output AND gate G15 to produce on the output 35 a signal indicating that a sync word has been detected. The next output of counter 18 will pass AND gate G16 since F3 is in the N state to produce an output through the OR gate 14 to switch the scan lock bistable multivibrator F2 to its N state cutting off the data stream to the sync word 12. The next start pulse from F1 or error gate pulse from AND gate G18 will reset the system for a new sync word detection scan and the operation will proceed as hereinabove stated. It is to be noted that the complement sync word may appear first followed in the next frame by the sync word in which case the operation is the same except gates G6 and G5 work in reverse order.

If the system of this FIGURE is started in its operation to detect a sync word and none appears through the first 240-bit count by the counter 18, this counter 18 output will be delayed in delay circuit 27 to set F6 in the A state and the counter 18 output from the second frame will produce a pulse on AND gate 17 occurring at the time of the output delayed pulse from 28 on G17 to switch F7 to the A state thus applying the pulses through the AND gate 18 to set F5 to its N state and at the same time to apply a pulse to the blocking oscillator to reset F2 in its A state. This takes three frames to accomplish as a result of two delays. The circuit just described provides the error gate signal for the circuit to reestablish the various bistable multivibrators AND gates for consideration of the next two frames of digital data information from the data stream 10. AND gate G21 is coupled to the last three bits of the counter 18 to produce an output signal through the OR gate G12 to place F2 in the A state for consideration of the next two frames of digital information in the event the output from blocking oscillator 15 fails.

The multivibrator F4 will always condition the AND gates G4 and G5 through the respective OR gates G10 and G11 to enable AND gates G4 and G5 for successive sync word and complementary sync word passage although F3 is shifted to its N position.

In accordance with the above description the circuit will accept frames of a data stream of digital information to search out and detect a true sync word from other digital information which may in itself constitute what appears to be a sync word but in fact is not. By the system shown and described hereinabove this sync word will be detected within two frames of the digital data stream to enable a receiver, which is separated and apart from the circuit shown herein, to receive and evaluate the digital information. The sync word output 35 from this circuit would be used in the receiver to synchronize the frames of data stream applied to the receiver.

While many modifications and changes may be made in the constructional details and features of this invention to accomplish the same results and functions herein shown and described, it is to be understood that I desire to be limited in the spirit of my invention only by the scope of the appended claims.

I claim:

1. A digital sync word detector for frame synchronism in a digital data information stream receiver comprising:

a sync window shift register having a shift register with inputs for a data stream and clock pulses and with predetermined bit outputs through real sync word AND gate output and with the opposite phase bit outputs through a complement sync word AND gate output;

a pair of bit shift registers, one real sync word bit shift register having an input coupled to said real sync word AND gate output and the other complement word bit shift register having an input coupled to said complement sync word AND gate output, each bit shift register having an output;

enabling gating means having an output coupled as an input to one each of said sync word and complementary word AND gates and having control signal inputs;

a pair of sync word detecting gates each having an output coupled as an input to a sync word OR gate the output of which is coupled to one of said control signal inputs of said enabling gating means and each having one input coupled from the output of the respective real sync word AND gate output and complement sync word AND gate and a second input cross coupled from said bit shift register outputs;

an output switch and AND gate means having a first input coupled to said sync word detecting OR gate output to produce on an output thereof a signal whenever a real sync word is detected and having second and third inputs through an OR gate;

an input and gate having one input coupled to receive the digital data stream and having an output coupled to said sync window data stream input; and a counter having an input coupled to receive and count said clock pulses and an output coupled through control switching gate means to said enabling gate means and to said output switch and AND gate means to count out frames of the data stream whereby a true sync word appearing in the data stream will be detected within two frames by comparison and coincidence of a detected sync word and its complement to produce an output signal indication.

2. A digital sync word detector for frame synchronization in a digital data stream receiver as set forth in claim 1 wherein said enabling gating means includes first and second bistable multivibrators, the first multivibrator having two inputs and two outputs with one input from said sync word OR gate, another input from a start signal, one output to an OR gate in each coupling to said sync window AND gate, and another output.

3. A digital sync word detector for frame synchronization in a digital data stream receiver as set forth in claim 2 wherein said second multivibrator has three inputs and two outputs, one output each being coupled as an input to one each enabling OR gate, two of said inputs being cross coupled to said bit shift register outputs, and said third input coupled to said counter.

4. A digital sync word detector for frame synchronization in a digital data stream receiver as set forth in claim 3 wherein said control switching gate means include a frame time AND gate having one input from said counter output and another input coupled to said other output of said first bistable multivibrator to pass a counter output signal through a frame time OR gate to an inhibiting circuit, the output of which is to an input of said input AND gate to block the digital data steam when a true sync word has been detected and the counter has counted the frame length.

5. A digital sync word detector for frame synchronization in a digital data stream reciever as set forth in claim 4 wherein said control switching gate means further includes a delay network, gate, and switch network, constructed and arranged to receive signals from said counter, from said sync window output AND gates, and from said sync word detecting OR gate to condition said output AND gate to pass and to block output of sync word detection to cause sync word detection within two frames of digital data.

6. A digital sync word detector for frame synchronization in a digital data stream receiver as set forth in claim 5 wherein said delay network, gate, and switch network comprise a first delay element, a third bistable multivibrator, a second delay element, a fourth bistable multivibrator, an AND gate, an OR gate, and a fifth bistable multivibrator, in that order from the output of said counter to the output of said sync word, the output of said first delay element being coupled to said output AND gate constituting said coupling from said counter, and said third and fourth bistable multivibrators having inputs from said sync word OR gate whereby the delayed signal from said counter conditions said output AND gate to gate a sync word detection and said signals from said sync window AND gates condition said fifth bistable multivibrator to establish an output sync word signal and to block said output sync word signal.

7. A digital sync word detector for frame synchronization in a digital data stream receiver as set forth in claim 6 wherein said inhibiting circuit is a sixth bistable multivibrator having two inputs and an output, one input constituting said input from said frame time OR gate and the other input being from a start signal, and said output constituting said inhibit circuit output.